(12) United States Patent
Therrian et al.

(10) Patent No.: US 6,919,113 B2
(45) Date of Patent: *Jul. 19, 2005

(54) MULTILAYERED FILM

(75) Inventors: Matthew A. Therrian, Chardon, OH (US); Dana M. Boyd, Painesville, OH (US); Bernard S. Mientus, Painesville, OH (US)

(73) Assignee: Avery Dennison Corporation, Pasadena, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/908,920

(22) Filed: Jul. 18, 2001

(65) Prior Publication Data

US 2003/0026958 A1 Feb. 6, 2003

(51) Int. Cl.$^7$ .............................................. B29D 22/00
(52) U.S. Cl. .................... 428/35.7; 428/195.1; 428/200; 428/212; 428/476.3; 428/483; 428/323; 428/480; 156/244.11
(58) Field of Search ............................ 428/195.1, 200, 428/212, 476.3, 483, 323, 35.7, 480, 195; 156/244.11; 204/210.7; 138/125

(56) References Cited

U.S. PATENT DOCUMENTS

| | | | |
|---|---|---|---|
| 4,501,798 A | 2/1985 | Koschak et al. | 428/349 |
| 4,590,020 A | 5/1986 | Itaba et al. | 264/22 |
| 4,705,714 A | 11/1987 | Itaba et al. | 428/215 |
| 4,762,737 A | 8/1988 | Lu | 428/35 |
| 4,824,912 A | 4/1989 | Su | 525/240 |
| 4,855,187 A | 8/1989 | Osgood, Jr. et al. | 428/516 |
| 4,870,122 A | 9/1989 | Lu | 524/488 |
| 4,916,025 A | 4/1990 | Lu | 428/516 |
| 5,206,075 A | 4/1993 | Hodgson, Jr. | 428/216 |

(Continued)

FOREIGN PATENT DOCUMENTS

| | | |
|---|---|---|
| EP | 0 436 044 A1 | 7/1991 |
| EP | 0 471 854 A1 | 2/1992 |
| EP | 0 600 482 B1 | 4/1998 |
| EP | 1 055 715 A1 | 11/2000 |
| EP | 1 176 003 A1 | 1/2002 |
| EP | 1 302 300 A1 | 4/2003 |
| WO | 93/03093 | 2/1993 |

OTHER PUBLICATIONS

3M Glossary of Plastic Industry Terms.*
3M Glossary of Plastic Industry Terms.*
U.S. Appl. No. 10/198,061, filed Jul. 18, 2002.
International Search Report, Application No. PCT/US02/15547, dated Jul. 31, 2002.

Primary Examiner—Rena Dye
Assistant Examiner—Tamra L. Dicus
(74) Attorney, Agent, or Firm—Renner, Otto, Boisselle & Sklar, LLP

(57) ABSTRACT

This invention relates to a multilayered film for use as in-mold label, comprising: a core layer having a first surface and a second surface, the core layer being comprised of a polymeric mixture and particulate solids dispersed in the polymeric mixture; and an ink-printable layer overlying the first surface of the core layer; the film being formed by co-extruding the core layer and ink-printable layer to form the multilayered film, hot-stretching the film at a temperature above the expected service temperature of the label to provide the film with a machine direction orientation, the density of the film being reduced by about 10% to about 25% during hot-stretching, and annealing the film at a temperature above the expected service temperature of the label; the film having a machine direction Gurley stiffness value in the range of about 30 to about 120, a machine direction shrinkage of less than about 3%, and a machine direction shrink tension at 200° F. (93.3° C.) of less than about 100 psi.

24 Claims, 3 Drawing Sheets

U.S. PATENT DOCUMENTS

| | | | |
|---|---|---|---|
| 5,223,346 A | 6/1993 | Lu | 428/516 |
| 5,227,233 A | 7/1993 | Itaba et al. | 428/354 |
| 5,242,650 A | 9/1993 | Rackovan et al. | 264/509 |
| 5,254,302 A | 10/1993 | Yamanaka | 264/129 |
| 5,264,277 A * | 11/1993 | Frognet et al. | 264/210.7 |
| 5,288,548 A * | 2/1994 | Weber | 428/315.9 |
| 5,366,796 A | 11/1994 | Murschall et al. | 428/216 |
| 5,419,960 A | 5/1995 | Touhsaent | 428/331 |
| 5,435,963 A * | 7/1995 | Rackovan et al. | 264/509 |
| 5,462,807 A | 10/1995 | Halle et al. | 428/500 |
| 5,530,065 A | 6/1996 | Farley et al. | 525/240 |
| 5,589,246 A | 12/1996 | Calhoun et al. | 428/120 |
| 5,716,698 A * | 2/1998 | Schreck et al. | 428/323 |
| 5,725,962 A | 3/1998 | Bader et al. | 428/515 |
| 5,733,615 A | 3/1998 | Rackovan et al. | 428/35.7 |
| 5,811,163 A | 9/1998 | Ohno et al. | 428/35.7 |
| 5,851,640 A * | 12/1998 | Schuhmann et al. | 428/200 |
| 6,004,682 A | 12/1999 | Rackovan et al. | 428/518 |
| 6,146,744 A | 11/2000 | Freedman | 428/213 |
| 6,150,013 A | 11/2000 | Balaji et al. | 428/220 |
| 6,287,684 B1 | 9/2001 | Yamanaka et al. | 428/343 |
| 6,312,825 B1 | 11/2001 | Su et al. | 428/484 |
| 6,376,058 B1 * | 4/2002 | Schut et al. | 428/220 |
| 6,444,301 B1 * | 9/2002 | Davidson et al. | 156/244.11 |
| 6,551,671 B1 | 4/2003 | Nishizawa et al. | 428/34.1 |
| 2002/0150706 A1 | 10/2002 | Tachi et al. | 428/34.5 |

* cited by examiner

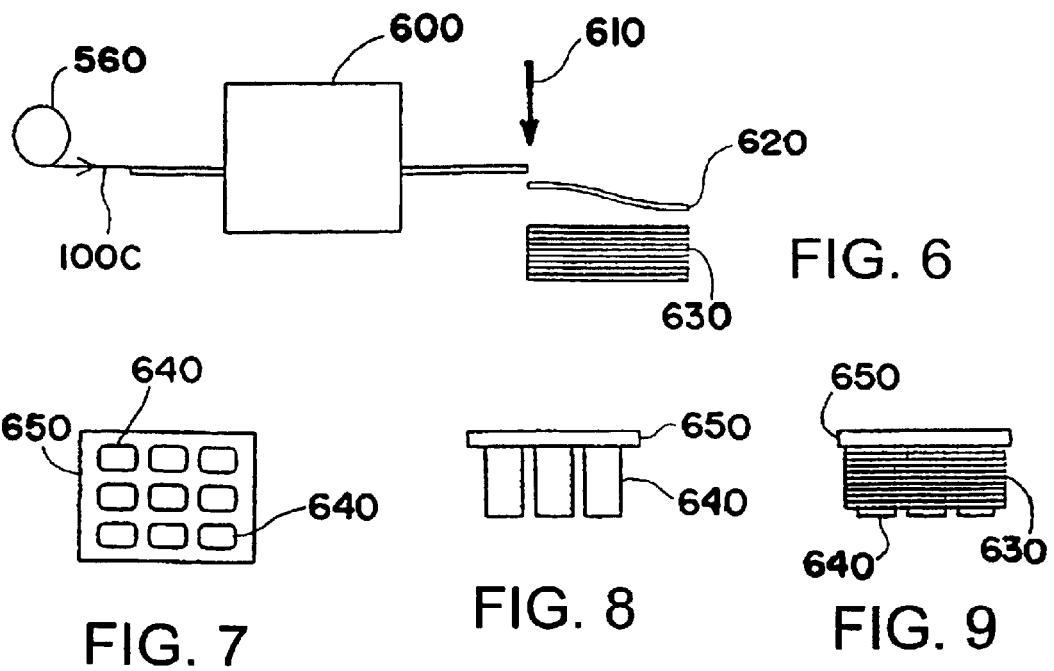
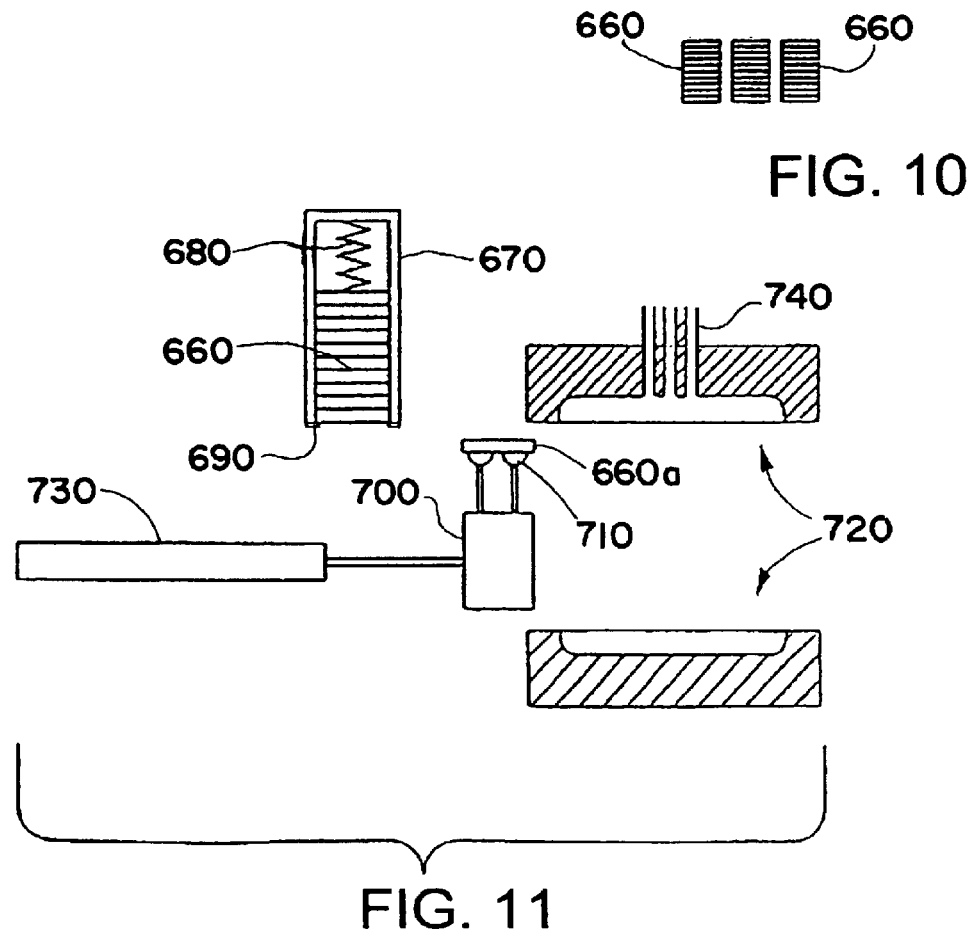

MULTILAYERED FILM

TECHNICAL FIELD

This invention relates to multilayered films and, more particularly, to multilayered films which are useful in making in-mold labels. Labels of this type are referred to as "in-mold" labels because the labels are held in place within the mold which forms the container during the container-forming process.

BACKGROUND OF THE INVENTION

Polymeric in-mold labels offer many aesthetic and functional advantages over paper labels in the labeling of containers made from polymeric resins using blow-molding, injection-molding or injection-blow molding. When a plastic container such as a high density polyethylene (HDPE) squeeze bottle is used to package a product such as a hair shampoo, a package using a polymeric label is generally more appealing to consumers than a package using a paper label. In many applications the use of polymeric in-mold labels is required for reasons of appearance, handling, performance, moisture-resistance, conformability, durability and compatibility with the container to be labeled. Polymeric in-mold labels also enable clear or substantially transparent labels with only the label indicia being visible to the consumer.

A problem with polymeric in-mold labels is that they tend to shrink during the container-forming process and collapse in the thickness or "Z" direction. As a result, these labels, when applied to a container, typically exhibit a surface roughness that detracts from the aesthetics of the graphic or printed image formed on the label.

The present invention provides a solution to this problem by providing a multilayered film that exhibits only minimal surface roughening after application as an in-mold label to a container. The labels made from this film, when applied to a container, typically exhibit a surface roughness on the print surface of about 100 microinches or less, as determined by test method ANSI B46.1. This compares to labels in the prior art which have been observed to exhibit a surface roughness that detracts from the aesthetics of the graphic or printed image formed on the label and have a surface roughness of about 200 microinches.

SUMMARY OF THE INVENTION

This invention relates to a multilayered film for use in making an in-mold label, comprising:

a core layer having a first surface and a second surface; and an ink-printable layer overlying the first surface of the core layer;

the core layer being comprised of a polymeric mixture and particulate solids dispersed in the polymeric mixture;

the polymeric mixture comprising a first polymer and a second polymer;

the first polymer being a high density polyethylene, a polypropylene, a polystyrene, a polyester, a copolymer of ethylene and propylene, a polyester copolymer, a polyamide, a polycarbonate or a mixture of two or more thereof;

the second polymer being a high melt flow polypropylene, a polybutylene, a copolymer of butene-1 and ethylene, or a mixture of two or more thereof;

the film being formed by co-extruding the core layer and ink-printable layer to form the multilayered film, hot-stretching the film at a temperature above the expected service temperature of the label to provide the film with a machine direction orientation, and annealing the film at a temperature above the expected service temperature of the label;

the density of the film being reduced by about 10% to about 25% during hot-stretching;

the film having a machine direction Gurley stiffness value in the range of about 30 to about 120 after hot-stretching and annealing;

the film having a machine direction shrinkage of less than about 3% after hot-stretching and annealing;

the film having a machine direction shrink tension at 200° F. (93.3° C.) of less than about 100 pounds per square inch (psi) after hot-stretching and annealing.

In one embodiment, the inventive film further comprises a base layer underlying the second surface of the core layer.

In one embodiment, the inventive film further comprises a first opacifying layer positioned between the first surface of the core layer and the ink-printable layer.

In one embodiment, the inventive film further comprises a first tie layer positioned between the first surface of the core layer and the ink-printable layer.

In one embodiment, the inventive film further comprises a base layer underlying the second surface of the core layer, a first opacifying layer positioned between the first surface of the core layer and the ink-printable layer, and a second opacifying layer positioned between the second surface of the core layer and the base layer.

In one embodiment, the inventive film further comprises a base layer underlying the second surface of the core layer, a first tie layer positioned between the first surface of the core layer and the ink-printable layer, and a second tie layer positioned between the second surface of the core layer and the base layer.

In one embodiment, the inventive film further comprises a base layer underlying the second surface of the core layer, a first opacifying layer positioned between the first surface of the core layer and the ink-printable layer, a first tie layer positioned between the first opacifying layer and the ink-printable layer, a second opacifying layer positioned between the second surface of the core layer and the base layer, and a second tie layer positioned between the second opacifying layer and the base layer.

The invention also relates to in-mold labels made from the inventive film, and to polymeric containers having the in-mold labels adhered to their surface. The in-mold labels include relatively large labels (e.g., surface area of about 12 square inches or larger), and the polymeric containers include relatively large containers (e.g., volume of about 48 fluid ounces or larger). The labels, when applied to the polymeric containers, are characterized by a printed surface having a very smooth texture, that is, a printed surface that exhibits a surface roughness of up to about 100 microinches as measured by test method ANSI B46.1.

BRIEF DESCRIPTION OF THE DRAWINGS

In the following drawings, like parts and features have like designations.

FIG. 6 is a diagrammatic representation of a printing, cutting and stacking line used in making the inventive in-mold labels.

FIGS. 7–10 diagrammatically illustrate the punch-cutting of the inventive in-mold labels to form stacks of labels.

FIG. 11 diagrammatically illustrates the use of the stacked labels in a molding operation.

DETAILED DESCRIPTION OF THE INVENTION

The term "overlies" and cognate terms such as "overlying" and the like, when referring to the relationship of one or a first layer relative to another or a second layer, refers to the fact that the first layer partially or completely lies over the second layer. The first layer overlying the second layer may or may not be in contact with the second layer. For example, one or more additional layers may be positioned between the first layer and the second layer. The term "underlies" and cognate terms such as "underlying" and the like have similar meanings except that the first layer partially or completely lies under, rather than over, the second layer.

The term "high density polyethylene" or "HDPE" refers to a polyethylene having a density of about 0.940 to about 0.965 g/cc.

The term "high melt flow polypropylene" refers to a polypropylene having a melt flow of about 8 to about 40 g/10 min. at 230° C. as determined by test method ASTM D1238.

The term "service temperature of the label" is the temperature of the label when used as an in-mold label while in the mold for making a polymeric container. The service temperature of the label may range from about 200° F. (93.3° C.) to about 290° F. (143.3° C.), and in one embodiment about 200° F. (93.3° C.) to about 260° F. (126.7° C.), and in one embodiment about 220° F. (104.4° C.) to about 260° F. (126.7° C.).

Figure 1:
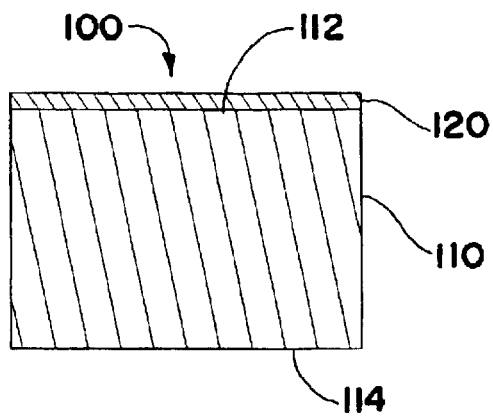
FIG. 1 is a schematic illustration of the side view of a multilayered film embodying the present invention in a particular form.

Referring to FIG. 1, the inventive multilayered film, in one of its illustrated embodiments, is generally indicated by the reference numeral 100, and is comprised of: a core layer 110 which has a first surface 112 and a second surface 114; and an ink-printable layer 120 overlying the first surface 112 of the core layer 110.

Figure 2:
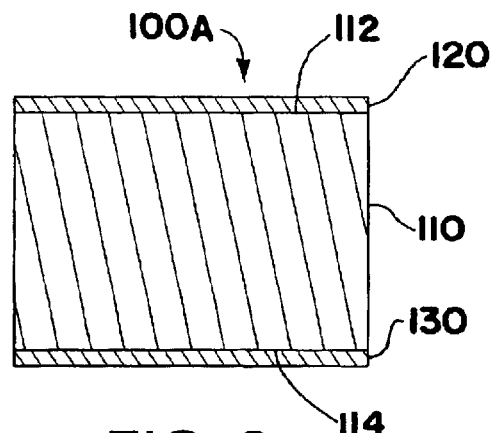
FIG. 2 is a schematic illustration of the side view of a multilayered film embodying an alternate embodiment of the present invention.

Referring to FIG. 2, the inventive multilayered film, in another of its illustrated embodiments, is generally indicated by the reference numeral 100A, and is comprised of: the core layer 110 which has the first surface 112 and second surface 114; the ink-printable layer 120 overlying the first surface 112 of the core layer 110; and a base layer 130 underlying the second surface 114 of the core layer 110.

Figure 3:
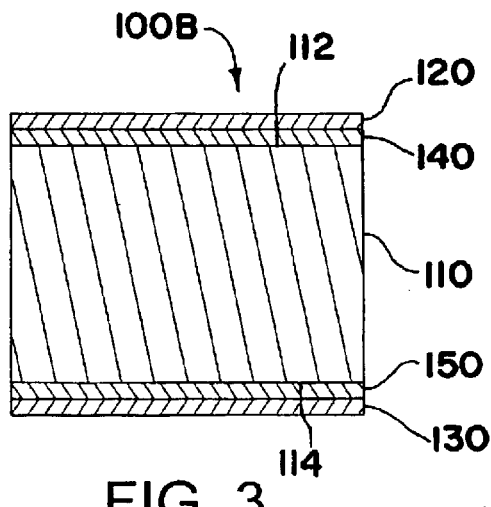
FIG. 3 is a schematic illustration of the side view of a multilayered film embodying another alternate embodiment of the invention.

Referring to FIG. 3, the inventive multilayered film, in another of its illustrated embodiments, is generally indicated by the reference numeral 100B, and is comprised of: the core layer 110 which has the first surface 112 and the second surface 114; the ink-printable layer 120 overlying the first surface 112 of the core layer 110; a first tie layer 140 positioned between the first surface 112 of the core layer 110 and the ink-printable layer 120; the base layer 130 underlying the second surface 114 of the core layer 110; and a second tie layer 150 positioned between the second surface 114 of the core layer 110 and the base layer 130.

Figure 4:
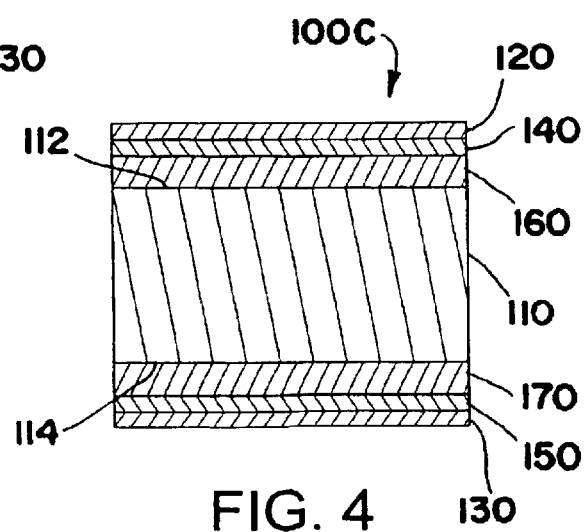
FIG. 4 is a schematic illustration of the side view of a multilayered film embodying still another alternate embodiment of the invention.

Referring to FIG. 4, the inventive multilayered film, in another of its illustrated embodiments, is generally indicated by the reference numeral 100C, and is comprised of: the core layer 110 which has the first surface 112 and the second surface 114; the ink-printable layer 120 overlying the first surface 112 of the core layer 110; the first tie layer 140 positioned between the first surface 112 of the core layer 110 and the ink-printable layer 120; the base layer 130 underlying the second surface 114 of the core layer 110; the second tie layer 150 positioned between the second surface 114 of the core layer 110 and the base layer 130; a first opacifying layer 160 positioned between the first surface 112 of the core layer 110 and the first tie layer 140; and a second opacifying layer 170 positioned between the second surface 114 of the core layer 110 and the second tie layer 150.

The overall thickness of the multilayered films 100, 100A, 100B and 100C may be in the range of about 2.5 to about 8 mils, and in one embodiment about 2.5 to about 6 mils, and in one embodiment about 2.5 to about 4.5 mils, and in one embodiment about 3 to about 4 mils. The thickness of the core layer 110 may range from about 70 to about 99% of the overall thickness of the multilayered films 100, 100A and 100B, and in one embodiment about 70% to about 95%, and in one embodiment about 85% of the overall thickness of the films 100, 100A and 100B. The core layer 110 may have a thickness of about 45 to about 89% of the overall thickness of the film 100C, and in one embodiment about 60% to about 85%, and in one embodiment about 70% of the overall thickness of the film 100C. The ink-printable layer 120 may have a thickness of about 1 to about 15% of the overall thickness of the films 100, 100A, 100B and 100C, and in one embodiment 1 to about 5%, and in one embodiment about 2.5% of the overall thickness of the films 100, 100A, 100B and 100C. The base layer 130 may have a thickness equal to about 1 to about 15% of the overall thickness of the films 100, 100A, 100B and 100C, and in one embodiment 1 to about 5%, and in one embodiment about 2.5% of the overall thickness of the films 100, 100A, 100B and 100C. Each of the tie layers 140 and 150 may have a thickness equal to about 3 to about 12% of the overall thickness of the films 100B and 100C, and in one embodiment about 3 to about 7%, and in one embodiment about 5% of the overall thickness of the films 100B and 100C. Each of the opacifying layers 160 and 170 may have a thickness equal to about 5 to about 40% of the overall thickness of the film 100C, and in one embodiment about 5 to about 20%, and in one embodiment about 7.5% of the overall thickness of the film 100C.

The core layer 110 and the opacifying layers 160 and 170 are each comprised of a film forming polymeric mixture of a first polymer and a second polymer with particulate solids dispersed throughout the polymeric mixture. The first polymer may be a high density polyethylene, a polypropylene, a copolymer of ethylene and propylene, a polystyrene, a polyamide (e.g., nylon), a polyester (e.g., polyethylene terephthalate), a polyester copolymer, a polycarbonate, or a mixture of two or more thereof. In one embodiment, the first polymer is polypropylene. An example of a commercially available polypropylene that can be used is available from Union Carbide-Dow under the trade designation 5A97. This material is identified as having a melt flow rate of 3.9 g/10 min. (ASTM D1238), a density of 903 kg/m$^3$ and a flexural or flex modulus of 1,590 MPa (ASTM D790A).

The second polymer may be a high melt flow polypropylene, a polybutylene, a copolymer of butene-1 and ethylene, or a mixture of two or more thereof. In one embodiment, the second polymer is a polybutylene or a copolymer of butene-1 and ethylene. Commercially available materials that can be used include the product available from Basell under the trade designation DP 8220, which is identified as a copolymer of butene-1 and ethylene having a melt flow rate of 1.8 g/10 min at 190° C./2.16 Kg and 6.5 g/10 min at 23° C./2.16 Kg (ISO 1133), a density of 0.897 g/cm$^3$ (ISO 1183/a), a melting point of 107° C. (225° F.) (DSC), and a softening point of 96° C. (205° F.) (ISO 306, Method A).

The polymeric mixture may be comprised of: about 60% to about 95% by weight, and in one embodiment about 85% to about 95% by weight, of the first polymer; and about 5% to about 40% by weight, and in one embodiment about 5% to about 15% by weight, of the second polymer.

The particulate solids may be any particulate solids that remain at least partially in separate phase from the polymeric mixture used in the core layer 110 and opacifying layers 160 and 170 during the hot-stretching step used in making the inventive films. The particulate solids may be organic or inorganic. Examples of organic particulate solids that may be used include polystyrene, rubber modified polystyrene, acrylonitrile-butadine-styrene (ABS), polymethyl methacrylate, polycarbonate, polyamide (e.g., nylon); high density polyethylene; polyester (e.g., polyethylene terephthalate); polyacetal; polypropylene; and acrylic resins. Examples of inorganic particulate solids that may be used include solid and hollow preformed glass spheres, metal beads or spheres; ceramic particles; titanium dioxide; calcium carbonate; barium sulfate; chalk; silicon dioxide; and clay. In one embodiment, the particulate solids are calcium carbonate. These particulate solids may have a mean particle size in the range of about 0.1 to about 12 microns, and in one embodiment about 0.5 to about 5 microns, and in one embodiment about 1 to about 3 microns. In one embodiment, the mean particle size is about 1 micron. In one embodiment, the mean particle size is about 3 microns. In one embodiment, a mixture of particulate solids is used, the mixture comprising particulate solids having a mean particle size of about 1 micron and particulate solids having a mean particle size of about 3 microns.

In one embodiment, a concentrate containing the particulate solids and a resin carrier is added to the mixture used to extrude the layers 110, 160 and/or 170. The concentrate may contain, for example, about 20% to about 80% by weight solids, and about 20% to about 80% by weight resin carrier. The resin carrier may be any thermoplastic polymer having a melting point or glass transition temperature in the range of about 90° C. to about 250° C. Examples include polyethylene, polypropylene, polystyrene, rubber modified polystyrene, ABS, polymethyl methacrylate, polycarbonate, ethylene methylacrylate, and the like. In one embodiment, a calcium carbonate concentrate is used which is comprised of a blend of about 50% to about 80% by weight polypropylene and about 20% to about 50% by weight calcium carbonate. An example of a commercially available concentrate that can be used is available from A. Schulman Inc. under the trade designation PF92D, which is identified as a calcium carbonate concentrate having a calcium carbonate concentration of 40% by weight in a polypropylene homopolymer carrier resin. In one embodiment, the concentrate is dried prior to being mixed with the remaining materials used in making the layers 110, 160 and/or 170 to insure that the concentrate contains little or no moisture.

The concentration of particulate solids in the core layer 110 and the opacifying layers 160 and 170 independently may range from 15% to about 35% by weight based on the overall weight of each of such layers, and in one embodiment about 20% to about 30% by weight.

The core layer 110 may include one or more pigments. The pigments that may be used include titanium dioxide. In one embodiment, a concentrate containing the pigment and a resin carrier is added to the mixture used to extrude the core layer. The concentrate may contain about 20% to about 80% by weight pigment, and about 80% to about 20% by weight resin carrier. The resin carrier may be any thermoplastic polymer having a melting point or glass transition temperature in the range of about 90° C. to about 250° C. Examples include polyethylene, polypropylene, polystyrene, rubber modified polystyrene, ABS, polymethyl methacrylate, polycarbonate, and the like. In one embodiment, a titanium dioxide concentrate is used which is comprised of a blend of about 30% to about 70% by weight polypropylene and about 70% to about 30% by weight titanium dioxide. An example of a commercially available pigment concentrate that can be used is available from A. Schulman Inc. under the tradename Polybatch P8555-SD, which is identified as a white color concentrate having a titanium dioxide concentration of 50% by weight in a polypropylene homopolymer carrier resin. The concentration of pigment in the core layer 110 may be up to about 70% by weight based on the weight of the core layer, and in any embodiment in the range of about 1% to about 40% by weight, and in one embodiment about 1 to about 20% by weight, and in one embodiment about 1% to about 10% by weight, and in one embodiment about 3.5% by weight.

The printable skin layer 120 and base layer 130 may be comprised of any thermoplastic polymeric material selected from high density polyethylene, polystyrene, rubber modified polystryene, ABS, polypropylene, polyvinylidene fluoride, polyester, cylic olefin copolymer, and mixtures of two or more thereof. An example of a commercially available material that may be used is Alathon XH6012 which is a product available from Equistar identified as a high density polyethylene. This polymeric material may be present in the layers 120 and 130 at a concentration of about 50 to about 100 percent by weight, and in one embodiment about 70 to about 95 percent by weight, and in one embodiment about 90% by weight.

The layers 120 and 130 may include one or more antiblock additives. Examples of useful antiblock additives include polypropylene, calcium carbonate and silicon dioxide. An example of a commercially available material that is useful as an antiblock additive is Union Carbide-Dow 5A97. The antiblock additive may be present in the layers 120 and 130 at a concentration in the range of about 0.1 to about 20 percent by weight, and in one embodiment about 0.5 to about 10 percent by weight, and in one embodiment about 7% by weight.

The tie layers 140 and 150 may be comprised of one or more adhesive materials optionally in combination with one or more additional film forming thermoplastic polymeric materials. The adhesive materials include ethylene vinyl acetate copolymers, ethylene methyl acrylate copolymers and ethylene butyl acrylate copolymers. An example of a commercially available material that can be used is the ethylene methyl acrylate copolymer available from Exxon Mobil under the trade designation Optema TC 120. This material is identified as having a methyl acrylate content of 21.5% by weight, a density of 0.942 g/cc, and a melt index of 6.0 g/10 min. The additional film forming thermoplastic polymeric materials that can be used include polypropylene, copolymers of ethylene and propylene, medium density polyethylene (density of about 0.924 to about 0.939 g/cc), terpolymers of ethylene, vinyl acetate and malic anhydride, and terpolymers of ethylene, vinyl acetate and acrylic acid. An example of a commercial thermoplastic polymeric material that may be used is Union Carbide-Dow 5A97. The weight ratio of adhesive material to additional film forming thermoplastic polymeric material may range from about 10:90 to about 100:0, and in one embodiment about 40:60 to about 70:30, and in one embodiment about 50:50.

In one embodiment, one or more of the layers 110, 120, 130, 140, 150, 160 or 170 contains one or more antistatic additives. These are used to dissipate static electricity charges. The antistatic additives that are useful include amines, amides, and derivatives of fatty acids. The amount of antistatic additive that is used may be varied for particular formulations and processing conditions. In one embodiment, the amount that is used may range up to about 1% by weight, and in one embodiment from about 0.01% to about 1%, and in one embodiment about 0.01 to about 0.5% by weight, and in one embodiment from about 0.05% to about 0.2% by weight. An example of antistatic additive that may be used is available from A. Schulman Inc. under the product name Polybatch VLA-55-SF. Polybatch VLA-55-SF is identified as a silica free antistatic additive concentrate containing 5% by weight of an antistatic additive dispersed in polypropylene.

The hot-stretching and annealing steps used in making the inventive film enhance the physical properties of the film. Hot-stretching is performed at a temperature above the expected service temperature of the label and provides the film with a machine direction orientation. The density of the film is reduced during this step by about 10% to about 25%, and in one embodiment about 15% to about 20%. The film is annealed at a temperature above the expected service temperature of the label to reduce shrinking, relaxing or distortion of the film which may interfere with the in-mold labeling process. During the hot-stretching and annealing steps, the extrudate is advanced through a series of relatively hot and cool rolls which contact the extrudate and impart heat to the extrudate or remove heat from it under time-temperature-direction conditions established by line speed, temperature, roll size, and side of contact. The direction at which the film advances through the rolls is the direction at which the film is hot-stretched and is oriented, This direction is sometimes referred to as the "machine direction." The term "cross direction" is used herein to refer to the direction going across the film at an angle of 90° from the machine direction.

During the hot-stretching step, the film is stretched and this stretching causes voids to form adjacent to or around the particulate solids. The solids act as "seeds" for the voids. The degree of stretching is controlled to provide the density reduction of about 10% to about 25%, as indicated above. While not wishing to be bound by theory, it is believed that this controlled stretching and void formation followed by the above-indicated annealing step is responsible for the relatively smooth print surfaces that are achieved with the inventive labels.

Figure 5:
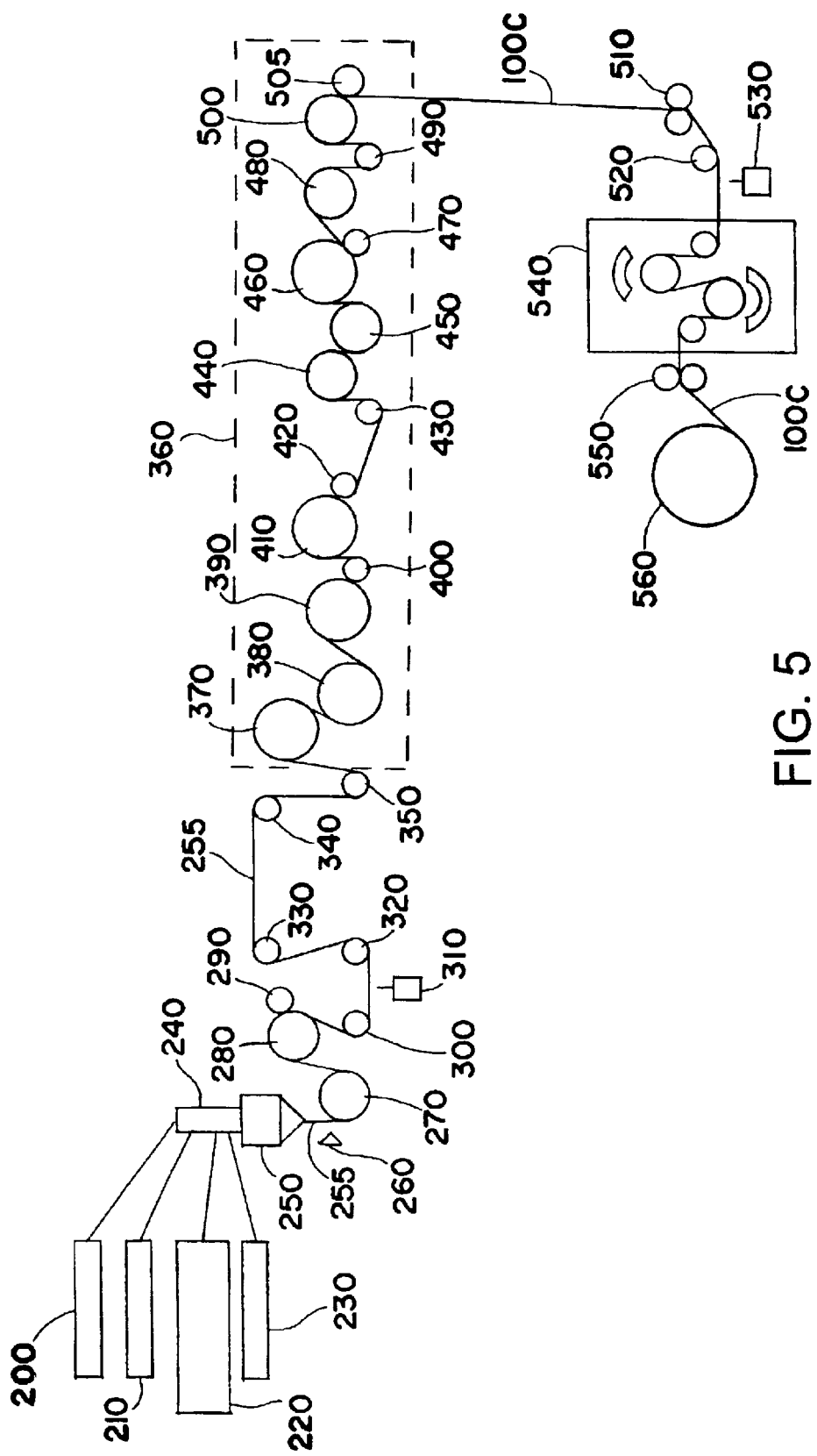
FIG. 5 is a flow diagram illustrating a co-extruding, stretching and annealing line used to make the inventive multilayered film.

The inventive multilayered film may be co-extruded, hot-stretched and annealed using the processing line depicted in FIG. 5. The processing line depicted in FIG. 5 will be described with reference to the film 100C illustrated in FIG. 4, but those skilled in the art will recognize that it is also suitable for making any of the films 100, 100A or 100B. The processing line includes extruders 200, 210, 220 and 230, feed block 240 and die 250. Extruder 200 is used for extruding ink-printable layer 120 and base layer 130. Extruder 210 is used for extruding tie layers 140 and 150. Extruder 220 is used for extruding core layer 110. Extruder 230 is used for extruding opacifying layers 160 and 170. The extrudate from the extruder 200 is advanced to the feed block 240 while at a temperature in the range of about 400° F. (204.4° C.) to about 470° F. (243.3° C.), and in one embodiment about 410° F. (210° C.). The extrudates from the extruders 210, 220 and 230 are advanced to the feed block 240 while at a temperature in the range of about 400° F. (204.4° C.) to about 470° F. (243.3° C.), and in one embodiment about 430° F. (221.1° C.). The extrudates from each of the extruders 200, 210, 220 and 230 are combined in feed block 240 and extruded through die 250 to form film extrudate 255. Feed block 240 and die 250 are operated at a temperature in the range of about 400° F. (204.4° C.) to about 470° F. (243.3° C.), and in one embodiment about 445° F. (229.4° C.). The film extrudate 255 extruded from die 250 may have a film thickness of about 10 to about 20 mils, and in one embodiment about 12 to about 15 mils. Air knife 260 is used to adhere film extrudate 255 to cast roll 270. The film extrudate 255 is advanced from cast roll 270 to cast roll 280, over cast roll 280, between cast roll 280 and cast nip roll 290, and then over guide rolls 300, 320, 330, 340 and 350 to machine direction orientation unit 360. Cast roll 270 is operated at a temperature of about 150° F. (65.6° C.) to about 200° F. (93.3° C.), and in one embodiment about 175° F. (79.4° C.). Cast roll 280 is operated at a temperature of about 100° F. (37.8° C.) to about 150° F. (65.6° C.), and in one embodiment about 120° F. (48.9° C.). The film is advanced over cast rolls 270 and 280 at a rate of about 40 to about 110 feet per minute, and in one embodiment about 85 feet per minute. The thickness of the film 255 is monitored using film thickness measuring device 310 as the film advances from guide roll 300 to guide roll 320. In the machine direction orientation unit 360, the film advances from pre-heat roll 370 to pre-heat roll 380. Pre-heat roll 370 is operated at a temperature of about 200° F. (93.3° C.) to about 270° F. (132.2° C.), and in one embodiment about 260° F. (126.7° C.). The film is advanced over pre-heat roll 370 at a rate of about 40 to about 110 feet per minute, and in one embodiment at about 86 feet per minute. Pre-heat roll 380 is operated at a temperature of about 200° F. (93.3° C.) to about 270° F. (132.2° C.), and in one embodiment about 260° F. (126.7° C.). The film advances over pre-heat roll 380 at a rate of about 40 to about 120 feet per minute, and in one embodiment about 89 feet per minute. The film is advanced from pre-heat roll 380 to draw roll 390, over draw roll 390, between draw roll 390 and draw nip roll 400 to draw roll 410, over draw roll 410 and then between draw roll 410 and draw nip roll 420 to guide roll 430. Draw roll 390 is operated at a temperature of about 200° F. (93.3° C.) to about 290° F. (143.3° C.), and in one embodiment at about 270° F. (132.2° C.). The film is advanced over draw roll 390 at a rate of about 40 to about 130 feet per minute, and in one embodiment at about 89 feet per minute. Draw roll 410 is operated at a temperature of about 200° F. (93.3° C.) to about 280° F. (137.8° C.), and in one embodiment about 270° F. (132.2° C.). The film is advanced over draw roll 410 at a rate of about 300 to about 600 feet per minute, and in one embodiment at about 402 feet per minute. The effect of advancing the film from draw roll 390 to draw roll 410 is to stretch the film sufficiently to provide the film with a machine direction orientation. The stretch ratio may range from about 4.4 to about 5.2, and in one embodiment at about 4.5 to about 4.9. The film is then advanced from annealing roll 440 to annealing roll 450. Annealing roll 440 is operated at a temperature of about 100° F. (37.8° C.) to about 150° F. (65.6° C.), and in one embodiment at about 120° F. (48.9° C.). Annealing roll 450 is operated at a temperature of about 70° F. (21.1° C.) to about 120° F. (48.9° C.), and in one embodiment at about 85° F. (29.4° C.). The film is advanced over annealing rolls 440 and 450 at a rate of about 285 to about 400 feet per minute, and in one embodiment at about 345 feet per minute. The film is then advanced from annealing roll 450 to cooling roll 460, over cooling roll 460 and between cooling roll 460 and cooling nip roll 470 to cooling roll 480, over cooling roll 480 to guide roll 490, over guide roll 490 to cooling roll 500, over cooling roll 500 and between cooling roll 500 and cooling nip 505 to nip rolls 510. Cooling roll 460 is operated at a temperature of about 70° C. (21.1° C.) to about 150° F. (65.6° C.), and in one embodiment at about 120° F. (48.90° C.). Cooling roll 480 is operated at a temperature of about 65° F. (18.3° C.) to about 120° F. (48.9° C.), and in one embodiment at about 85° F. (29.4° C.). Cooling roll 500 is operated at a temperature of about 65° F. (18.3° C.) to about 120° F. (48.9° C.), and in one embodiment at about 70° F. (21.1° C.). The film is advanced over cooling rolls 460, 480 and 500 at a rate of about 300 to about 600 feet per minute, and in one embodiment about 345 feet per minute. The film is advanced through nip rolls 510 to guide roll 520, then over guide roll 520 to corona treating station 540. The thickness of the film is monitored using film thickness measuring device 530 which is positioned at the entrance to the corona treating station 540. In the corona treating station, both sides of the film are treated to increase surface energy. The surface energy on the surface of the ink-printable layer 120 is increased sufficiently to enhance adhesion of ink to the surface during subsequent printing operations. The surface energy of the surface of the base layer 130 is increased sufficiently to increase adhesion of the in-mold label to the polymeric container during the container formation step. The film is advanced from the corona treating station 540 through nip rolls 550 to roll 560 where it is wound on the roll for subsequent processing. The film is advanced through corona treating station at a rate of about 300 to about 600 feet per minute, and in one embodiment about 345 feet per minute.

The hot-stretching and annealing of the film increases stiffness of the film in the machine direction but leaves the film relatively flexible in the cross direction. This process may be referred to as uniaxial stretching. In one embodiment, it is contemplated to use unbalanced or balanced biaxial stretching of the film to achieve a satisfactory stiffness differential between the machine and cross directions, with the degrees of stretching and stiffness in the machine direction exceeding those in the cross direction. Whether the stretching is biaxial or uniaxial, that is, whether there is little (relatively) or no stretching in the cross direction, the degree of stretching in the machine direction exceeds that in the cross direction so that the film is substantially stiffened in the machine direction and remains relatively flexible in the cross direction.

Therefore the film, whether uniaxially or biaxially stretched, may be referred to as having a machine direction stiffness differential. In one embodiment, the Gurley stiffness in the machine direction is from about 30 to about 120, and in one embodiment about 40 to about 60. The cross-direction Gurley stiffness may be from about 30 to about 120, and in one embodiment, from about 35 to about 45. Gurley stiffness is measured using test method Tappi T543PM-84.

Uniaxial hot-stretching and annealing are also important to the development of in-mold label film tensile properties necessary to withstand the mechanical and thermal stresses of conventional printing techniques of the type used in processing paper labels. The stretched and annealed film should have a tensile modulus greater than about 65,000 psi and an elongation at break of less than about 950%. Tensile properties including elongation and modulus are measured using the method set forth in ASTM D882-97.

The inventive films are characterized by a machine direction shrinkage after hot-stretching and annealing of less than about 3%, and in one embodiment less than about 2%, and in one embodiment less than about 1%, and in one embodiment less than about 0.75%, and in one embodiment in the range of about 0.1 to about 1%, and in one embodiment in the range of about 0.25 to about 0.75%. Shrinkage is determined using test method ASTM D 2739-96.

The inventive films are characterized by a shrink tension at 200° F. of less than about 100 psi, and in one embodiment less than about 50 psi, and in one embodiment less than about 30 psi. Shrink tension is measured using test method ASTM D2838.95.

As schematically illustrated in FIG. 6, the stretched and annealed film 100C, which may be supplied in the form of self-wound roll 560, may be printed or decorated in a printing press 600 in which the film is subjected to mechanical and thermal stress incident to the printing itself and to the drying of the ink by exposure to heat as such or by exposure to ultraviolet radiation which tends to also generate infrared radiation.

Following printing and drying, the film may be sheeted and stacked in a manner similar to that known for the sheeting of paper-backed label stock. Cutting is indicated by arrow 610 in the drawings. The severed sheets 620 are stacked to form stack 630. The stack may contain, for example, 100 or 200 sheets. For clarity of illustration, in the drawing the thickness of the sheets is greatly exaggerated and the stack 630 is therefore shown as made up of only a relatively small number of sheets. Each sheet in the stack is intended to provide material for several individual labels to be die-cut from the sheeted material. In the particular example described, nine labels are die-cut from each sheet. The sheets in the stack are accurately registered with each other so that the labels to be cut from the sheet will be formed in correct registration to the printing that appears on their face according to the pattern printed by the press 600.

If the film is too limp, accurate stacking is prevented due to the inability to guidingly control positioning of a limp sheet by means of belts, guideways, stops or similar guiding mechanisms (not shown) with any degree of accuracy. The stiffening of the inventive film by hot-stretching to desired stiffnesses, as discussed above, allows for accurate stacking to be achieved.

Accurate stacking and subsequent handling of the sheets or labels formed therefrom is also impeded if static charges are present on the sheets or labels. The antistatic additives discussed above act to remove or dissipate static charges.

Individual labels are formed in a known manner by hollow punches or cutting dies 640 carried on a head 650, seen in bottom plan view in FIG. 7 and in side elevation in FIGS. 8 and 9. The cutting dies punch out the labels from the stack 630, producing in each cutting cycle a number of stacks 660 of individual labels shown in FIG. 10. In the particular example described, nine stacks of individual labels are produced in each cutting cycle.

Alternatively, following printing and drying, the stock may be fed into a rotary steel die (not shown) at the end of the printing press line and cut into labels. As the cut labels and surrounding matrix of waste material exit from the rotary steel die, the matrix is pulled away at an angle from the labels which are sufficiently stiff to continue their forward travel into a nip of a pair of feed belts (not shown) for collection into stacks 660. Thus, the machine direction stiffness is utilized in a direct label cutting and separating process which eliminates the cutting step at 610 as well as the other steps described with respect to FIGS. 7, 8 and 9.

The stacks 660 of individual labels are stabilized by suitable wrapping or packaging (not shown) in a manner similar to that previously used with paper-backed labels. The stabilized stacks 660 are then moved or transported to the site where the blow-molded, injection molded or injection-blown containers are being manufactured, which often is at a different place than the site of label manufacture.

At the site of container manufacture, stacks 660 of individual labels are loaded in dispensing magazine 670 as schematically illustrated in FIG. 11. For example, the labels may be advanced to the front of the magazine by a spring 680, and may be lightly retained for pick-off by mechanically retracting retainer fingers 690. A robotic label feed head 700 carries vacuum cups 710 adapted to be advanced by a mechanism (not shown) internal to the head 700 to pick off the front label 660a in the stack 660. The vacuum cups are retracted for translating movement of the head and the single picked-off label 660a into the opened mold 720. Movement of the head 700 is actuated by translating cylinder 730. The vacuum cups 710 are advanced again to apply the picked-off label 660a to the interior surface of the mold and release it. The label may then be held accurately in position within the mold by vacuum applied to the mold wall through vacuum lines 740 while the label feed head 700 is retracted. The vacuum line outlets to the interior of the mold may be flush with the interior surface of the mold, as shown, so that the label occupies part of the mold cavity proper. In other words, there is no recess on the interior mold surface to accommodate the label.

A hot workpiece or parison (not shown) of high density polyethylene or similar thermoplastic resin is fed into the mold 720, the mold is closed, and the parison is expanded in a known manner to complete the formation of the molded container. The hot-stretching and annealing temperatures used in making the inventive film exceed the service temperature in the mold. To assure a uniform joining of the label to the container, it is desirable that the softening temperature of the in-mold label film be close to the service temperature. If the label is on, not in, the interior surface of the mold, the label becomes embedded in the workpiece to which it is adhered, thus advantageously providing an inset label that is flush with the container surface and that replaces and therefore saves a portion of the charge for the molded workpiece or container without diminishing the structural integrity of the workpiece to any detected degree.

The print surface of the inventive in-mold labels, after being adhered to a container, is characterized by a surface roughness, $R_a$, of up to about 100 microinches, and in one embodiment about 5 to about 100 microinches, and in one embodiment about 5 to about 75 microinches, and in one embodiment about 10 to about 50 microinches, and in one embodiment about 15 to about 35 microinches, as determined by test method ANSI B46.1.

The following examples are provided to further disclose the invention.

EXAMPLE 1

A multilayered film corresponding to film 100C in FIG. 4 is prepared by co-extruding, stretching and annealing the following layers (all percentages being by weight):

Core Layer 110—70.0% of total film thickness
- 72.0% Schulman Polybatch PF92D (40.0% $CaCO_3$ dispersed in polypropylene)
- 7.0% Schulman Polybatch P8555-SD (50.0% $TiO_2$ dispersed in polypropylene)
- 10.0% Basell DP 8220 (copolymer of butene-1 and ethylene)
- 9.5% Union Carbide-Dow 5A97 (polypropylene)
- 1.5% Schulman Polybatch VLA5SF (5.0% antistatic additive dispersed in polypropylene)

Ink-printable layer 120 and base layer 130—2.5% of total film thickness for each layer
- 2.5% Schulman Polybatch VLA5SF
- 7.0% Union Carbide-Dow 5A97
- 90.5% Equistar XH 6012 (high density polyethylene)

Tie Layers 140 and 150—5.0% of total film thickness for each layer
- 50.0% Exxon-Mobil Optima TC120 (ethylene methyl acrylate copolymer)
- 48.5% Union Carbide-Dow 5A97
- 1.5% Schulman Polybatch VLA5SF Opacifying Layers 160 and 170—7.5% of total film thickness for each layer
- 72.0% Schulman Polybatch PF92D
- 16.5% Union Carbide-Dow 5A97
- 10.0% Basell DP 8220
- 1.5% Schulman Polybatch VLA5SF The above-indicated multilayered film is co-extruded, hot-stretched and annealed using the line illustrated in FIG. 5 under two different sets of conditions as indicated below. In the table below, the term "fpm" stands for feet per minute.

|  | Run A | Run B |
|---|---|---|
| Cast roll 270 | | |
| Temp | 180° F. (95° C.) | 170° F. (76.7° C.) |
| Rate (fpm) | 68 | 55 |
| Cast roll 280 | | |
| Temp | 120° F. (48.9° C.) | 120° F. (48.9° C.) |
| Rate (fpm) | 68 | 56 |
| Pre-heat roll 370 | | |
| Temp | 260° F. (126.7° C.) | 160° F. (71.1° C.) |
| Rate (fpm) | 67 | 56 |
| Pre-heat roll 380 | | |
| Temp | 260° F. (126.7° C.) | 260° F. (126.7° C.) |
| Rate (fpm) | 69 | 58 |
| Draw roll 390 | | |
| Temp | 270° F. (132.2° C.) | 260° F. (126.7° C.) |
| Rate (fpm) | 69 | 58 |
| Draw roll 410 | | |
| Temp | 270° F. (132.2° C.) | 270° F. (132.2° C.) |
| Rate (fpm) | 336 | 260 |
| Annealing roll 440 | | |
| Temp | 270° F. (132.2° C.) | 270° F. (132.2° C.) |
| Rate (fpm) | 295 | 224 |
| Annealing roll 450 | | |
| Temp | 270° F. (132.2° C.) | 270° F. (132.2° C.) |
| Rate (fpm) | 294 | 222 |

-continued

|  | Run A | Run B |
|---|---|---|
| Cooling roll 460 | | |
| Temp | 120° F. (48.9° C.) | 120° F. (48.9° C.) |
| Rate (fpm) | 294 | 222 |
| Cooling roll 480 | | |
| Temp | 85° F. (29.4° C.) | 85° F. (29.4° C.) |
| Rate (fpm) | 292 | 221 |
| Cooling roll 500 | | |
| Temp | 70° F. (21.1° C.) | 70° F. (21.1° C.) |
| Rate (fpm) | 295 | 223 |

The films produced above have the following properties. In the table below, the term "psi" refers to pounds per square inch.

|  | Run A | Run B |
|---|---|---|
| Film thickness (mils) | 4.05 | 4.01 |
| Gurly Stiffness (Tappi T543 PM-84) | | |
| Machine Direction | 57.1 | 59.2 |
| Cross Direction | 40.4 | 45.0 |
| Opacity (Tappi T425 OS-75) | 83.7 | 80.5 |
| Surface energy in dynes after 10 days of production | | |
| Print Side | 40 | 42 |
| Base Side | 41 | 40 |
| Coefficient of Friction (Print/Base) (ASTM D1894–95) | | |
| Static | 0.24 | 0.28 |
| Kinetic | 0.23 | 0.26 |
| % Ash (ASTM D5630–94) | 21.8 | 18.7 |
| Secant Modulus (psi) (ASTM D882–97) | | |
| Machine Direction | 150,546 | 141,976 |
| Cross Direction | 79,485 | 83,954 |
| Elongation (%) (ASTM D882–97) | | |
| Machine Direction | 68.2 | 75.9 |
| Cross Direction | 41.7 | 31.2 |
| Tensile Yield (lbs) (ASTM D882–97) | | |
| Machine Direction | 58.7 | 50.0 |
| Cross Direction | 9.0 | 10.0 |
| Ultimate Tensile Strength (psi) (ASTM D882–97) | | |
| Machine Direction | 14622 | 13830 |
| Cross Direction | 2216 | 2301 |
| Shrinkage (%) (ASTM D2739–96) | | |
| Machine Direction | 0.51 | 0.51 |
| Cross Direction | 0.24 | 0.30 |
| Shrink Tension (psi) (ASTM D2838–95) | | |
| @ 200° F. (93.3° C.) | 7.1 | 18.3 |
| @ 220° F. (104.4° C.) | 21.6 | 26.7 |
| @ 240° F. (115.6° C.) | 31.9 | 46.5 |
| @ 260° F. (126.7° C.) | 75.6 | 72.5 |

EXAMPLE 2

A multilayered film corresponding to film 100B in FIG. 3 is prepared by co-extruding, hot-stretching and annealing a film extrudate to make a four-mil multilayered film having the following layers (all percentages being by weight):
Core Layer 110—85.0% of total film thickness
  72.0% Schulman Polybatch PF92D
  7.0% Schulman Polybatch P8555-SD
  10.0% Basell DP 8220
  9.5% Union Carbide-Dow 5A97
  1.5% Schulman Polybatch VLA5SF
Ink-printable layer 120 and base layer 130—2.5% of total film thickness for each layer
  2.5% Schulman Polybatch VLA5SF
  7.0% Union Carbide-Dow 5A97
  90.5% Equistar XH 6012
Tie Layers 140 and 150—5.0% of total film thickness for each layer
  50.0% Exxon-Mobil Optema TC120
  48.5% Union Carbide-Dow 5A97
  1.5% Schulman Polybatch VLA5SF While the invention has been explained in relation to specific embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A multilayered film for use in making an in-mold label, comprising:
    a core layer having a first surface and a second surface; and
    an ink-printable layer overlying the first surface of the core layer,
      the core layer being comprised of a polymeric mixture, and an antistatic additive and particulate solids dispersed in the polymeric mixture;
        the polymeric mixture comprising a first polymer and a second polymer;
        the first polymer being a high density polyethylene, a polypropylene, a polystyrene, a polyester, a copolymer of ethylene and propylene, a polyester copolymer, a polyamide, a polycarbonate or a mixture of two or more thereof;
        the second polymer being a high melt flow polypropylene, a polybutylene, a copolymer of butene-1 and ethylene, or a mixture of two or more thereof;
    the multilayered film being a co-extruded, hot-stretched and annealed film having a machine direction orientation wherein the film was hot-stretched at a first temperature above the expected service temperature of the label to provide the film with a machine direction orientation, and the film was annealed at a second temperature above the expected service temperature of the label;
    the density of the film being reduced by about 10% to about 25% relative to an unstretched film;
    the film having a machine direction Gurley stiffness value in the range of about 30 to about 120;
    the film having a machine direction shrinkage of less than about 3%; and the film having a machine direction shrink tension at 200° F. (93.3° C.) of less than about 100 psi.

2. The film of claim 1 wherein the film further comprises a base layer underlying the second surface of the core layer, wherein the base layer is different from the ink-printable layer.

3. The film of claim 1 wherein the film further comprises a first opacifying layer positioned between the first surface of the core layer and the ink-printable layer, the first opacifying layer having a concentration of particulate solids in a range of from about 15 weight percent to about 35 weight percent.

4. The film of claim 1 wherein the film further comprises a first tie layer positioned between the first surface of the core layer and the ink-printable layer.

5. The film of claim 2 wherein the film further comprises a first opacifying layer positioned between the first surface of the core layer and the ink-printable layer, and a second opacifying layer positioned between the second surface of the core layer and the base layer.

6. The film of claim 2 wherein the film further comprises a first tie layer positioned between the first surface of the core layer and the ink-printable layer, and a second tie layer positioned between the second surface of the core layer and the base layer.

7. The film of claim 2 wherein the film further comprises a first opacifying layer positioned between the first surface of the core layer and the ink-printable layer, a first tie layer positioned between the first opacifying layer and the ink-printable layer, a second opacifying layer positioned between the second surface of the core layer and the base layer, and a second tie layer positioned between the second opacifying layer and the base layer.

8. The film of claim 1 wherein the first polymer is polypropylene and the second polymer is polybutylene.

9. The film of claim 1 wherein the particulate solids are comprised of calcium carbonate, and the particulate solids comprise a mixture of particles having differing mean particle sizes, wherein a first portion of the mixture includes particles with a mean particle size of about 1 micron, and a second portion of the mixture includes particles with a mean particle size of about 3 microns.

10. The film of claim 1 wherein the core layer contains about 15 to about 35 percent by weight particulate solids.

11. The film of claim 1 wherein the core layer further comprises a pigment.

12. The film of claim 1 wherein the ink-printable layer is comprised of polypropylene, high density polyethylene and an antistatic additive.

13. The film of claim 2 wherein the base layer is comprised of polypropylene, high density polyethylene and an antistatic additive.

14. The film of claim 3 wherein the first opacifying layer is comprised of: polypropylene; polybutylene or a copolymer of butene-1 and ethylene; calcium carbonate; and an antistatic additive.

15. The film of claim 4 wherein the first tie layer is comprised of polypropylene, an ethylene-methyl acrylate copolymer and an antistatic additive.

16. The film of claim 2 wherein the ink-printable layer and the base layer are comprised of polypropylene, high density polyethylene and an antistatic additive.

17. The film of claim 5 wherein the first opacifying layer and the second opacifying layer are different from each other.

18. The film of claim 6 wherein the first tie layer and the second tie layer are comprised of polypropylene, an ethylene-methyl acrylate copolymer and an antistatic additive.

19. An in-mold label, comprising:
a core layer having a first surface and a second surface, the core layer comprising a pigment, and a mixture of film-forming polymers comprising polybutylene and a polymer selected from the group consisting of polyethylene, polypropylene, polystyrene, polyester, copolymer of ethylene and propylene, polyester copolymer, polyamide, polycarbonate, and mixtures thereof; and
a co-extruded ink-printable layer adjacent to and overlying the core layer first surface to form a multilayered film, and
the multilayered film being a hot-stretched and annealed film having a uniaxial machine direction orientation, a machine direction Gurley stiffness value in a range of from about 30 to about 120, a machine direction shrinkage of less than about 3 percent, a machine direction shrink tension at 93.3° C. (200° F.) of less than about 100 psi, and a density that is reduced by about 10% to about 25% relative to an unstretched film.

20. The label of claim 19, wherein the core layer further comprises a mixture of particulate solids, wherein a first portion of the mixture includes particles with a mean particle size of about 1 micron, and a second portion of the mixture includes particles with a mean particle size of about 3 microns.

21. A container labeling system, comprising:
an in-mold label comprising a multilayered film, the film comprising a core layer having a first surface and a second surface, and an ink-printable layer overlying the core layer first surface,
the core layer being comprised of a polymeric mixture, and an antistatic additive and particulate solids dispersed in the polymeric mixture;
the polymeric mixture comprising a first polymer and a second polymer;
the first polymer being a high density polyethylene, a polypropylene, a polystyrene, a polyester, a copolymer of ethylene and propylene, a polyester copolymer, a polyamide, a polycarbonate or a mixture of two or more thereof;
the second polymer being a high melt flow polypropylene, a polybutylene, a copolymer of butene-1 and ethylene, or a mixture of two or more thereof;
the multilayered film being a co-extruded, hot-stretched and annealed film having a machine direction orientation the film was hot-stretched at a first temperature above the expected service temperature of the label and thereby to provide the film with a machine direction orientation, and the film was annealed at a second temperature above the expected service temperature of the label;
the density of the film being reduced by about 10% to about 25% relative to an unstretched film;
the film having a machine direction Gurtey stiffness value in the range of about 30 to about 120;
the film having a machine direction shrinkage of less than about 3%; and
the film having a machine direction shrink tension at 200° F. (93.3° C.) of less than about 100 psi.

22. The container labeling system of claim 21, wherein the in-mold label has a surface area of at least about 12 square inches.

23. The container labeling system of claim 21, further comprising a polymeric container, and the in-mold label being molded onto a surface of the container, wherein the ink-printable layer has an ink-printed surface, and the ink-printed surface has a surface roughness of up to about 100 microinches as determined by test method ANSI B46.1.

24. The container labeling system of claim 23, wherein the container has a capacity of at least about 48 fluid ounces.

* * * * *

UNITED STATES PATENT AND TRADEMARK OFFICE
CERTIFICATE OF CORRECTION

PATENT NO. : 6,919,113 B2
DATED : July 19, 2005
INVENTOR(S) : Therrian et al.

It is certified that error appears in the above-identified patent and that said Letters Patent is hereby corrected as shown below:

Column 16,
Line 48, replace "Gurtey" with -- Gurley --.

Signed and Sealed this

Twentieth Day of September, 2005

JON W. DUDAS
*Director of the United States Patent and Trademark Office*